United States Patent [19]

McClellan et al.

[11] Patent Number: 5,329,325
[45] Date of Patent: Jul. 12, 1994

[54] SYNCHRONIZED ZOOM ELECTRONIC CAMERA SYSTEM

[75] Inventors: Larry D. McClellan, New Hope; Denis L. Larson, Andover; Rolf D. Ingersoll, Minnetonka; Jerome W. Lindenfelser, Brooklyn Park; Roger M. Johnson, Minneapolis, all of Minn.

[73] Assignee: Photo Control Corporation, Minneapolis, Minn.

[21] Appl. No.: 93,534

[22] Filed: Jul. 16, 1993

[51] Int. Cl.$^5$ .................... G03B 29/00; G03B 1/18; H04N 5/225; H04N 9/64

[52] U.S. Cl. .................... 354/76; 354/81; 354/195.12; 348/64; 348/224; 348/229

[58] Field of Search .............. 354/76, 81, 293, 195.1, 354/430, 195.12; 358/29, 906, 909, 228

[56] References Cited

U.S. PATENT DOCUMENTS

| | | | |
|---|---|---|---|
| 3,643,570 | 2/1972 | Reid et al. | 354/81 |
| 4,488,794 | 12/1984 | Dolgow et al. | 354/195.1 |
| 4,908,640 | 3/1990 | Masuda | 354/81 X |
| 4,920,371 | 4/1990 | Kaneko | 354/76 X |
| 5,008,697 | 4/1991 | Noble | 358/909 X |
| 5,023,635 | 6/1991 | Nealon | 354/76 |

Primary Examiner—Michael L. Gellner
Assistant Examiner—Jae N. Noh
Attorney, Agent, or Firm—Merchant, Gould, Smith, Edell, Welter & Schmidt

[57] ABSTRACT

The present invention is directed to a multiple camera system which captures a photo image on film and captures and stores an electronic image on a magnetic recording media. The system has two operating states. In the "compose" or "view" state the electronic image channel is operated at a first gain setting, color temperature and F-stop to provide a real time moving image on a monitor. In the capture state the electronic gain, color temperature, and F-stop of the electronic camera are altered to collect or capture an electronic image during strobe illumination. The system utilizes a pair of dedicated zoom lenses, which are mechanically corrected for parallax error and the focal length of the two lenses are matched and linked together so that their focal lengths may be altered simultaneously by the operator.

5 Claims, 4 Drawing Sheets

SYNCHRONIZED ZOOM ELECTRONIC CAMERA SYSTEM

TECHNICAL FIELD

The present invention is directed to a multiple camera system which captures a photo image on film and captures and stores an electronic image on a magnetic recording media.

BACKGROUND

There are camera systems available which combine a video or electronic imaging system with a photographic still camera. In devices of this type the electronic image is immediately available for "proofing" and the like. However it is important that the pose captured by the electronic system be identical to the pose captured by the photographic media. It is also important that the color rendition and other qualitative parameters between the electronically recorded and photographically recorded images, closely match as an aid to the proofing process. Attainment of this goal has remained elusive in practice.

One approach to the problems described above is taught by U.S. Pat. No. 4,805,037 to Noble et al. This patent teaches the use of an optical beam splitter device which divides the image. The electronic camera portion of the system records a video image promptly after the termination of the "strobe" or flash illumination which is used to capture the photo image.

SUMMARY

In contrast to the teachings of the reference, the present invention is a multiple camera system which captures two parallax corrected images on two separate cameras at the same time. The present system has two operating states. In the "compose" or "view" state the electronic image channel is operated at a first gain setting, color temperature and F-stop to provide a real time moving image on a monitor. Upon the activation of a user switch, the camera system enters a so called "capture" state. In the capture state the electronic gain, color temperature, and F-stop of the electronic camera are altered to collect or capture an electronic image during strobe illumination. This captured electronic image is stored on an appropriate magnetic recording media. The capture state is synchronized or coordinated in part by the shutter mechanism of the photo camera which captures the photographic image simultaneously with the electronic image capture.

The camera system also utilizes a pair of dedicated zoom lenses. These lens are mechanically corrected for parallax error and the focal length of the two lenses are synchronized and linked together so that their focal lengths may be altered simultaneously by the operator. Simultaneous and synchronized zoom is an aid to rapid composition which increases the utility of the camera system by providing the same image proportions within the two image receiving media frame sizes.

BRIEF DESCRIPTION OF DRAWING

The figures depict an illustrative but not limiting example of the camera system. Throughout the drawing like reference numerals designate identical or corresponding parts through the several views and more particularly.

DETAILED DESCRIPTION OF THE ILLUSTRATIVE EMBODIMENT

Figure 1:
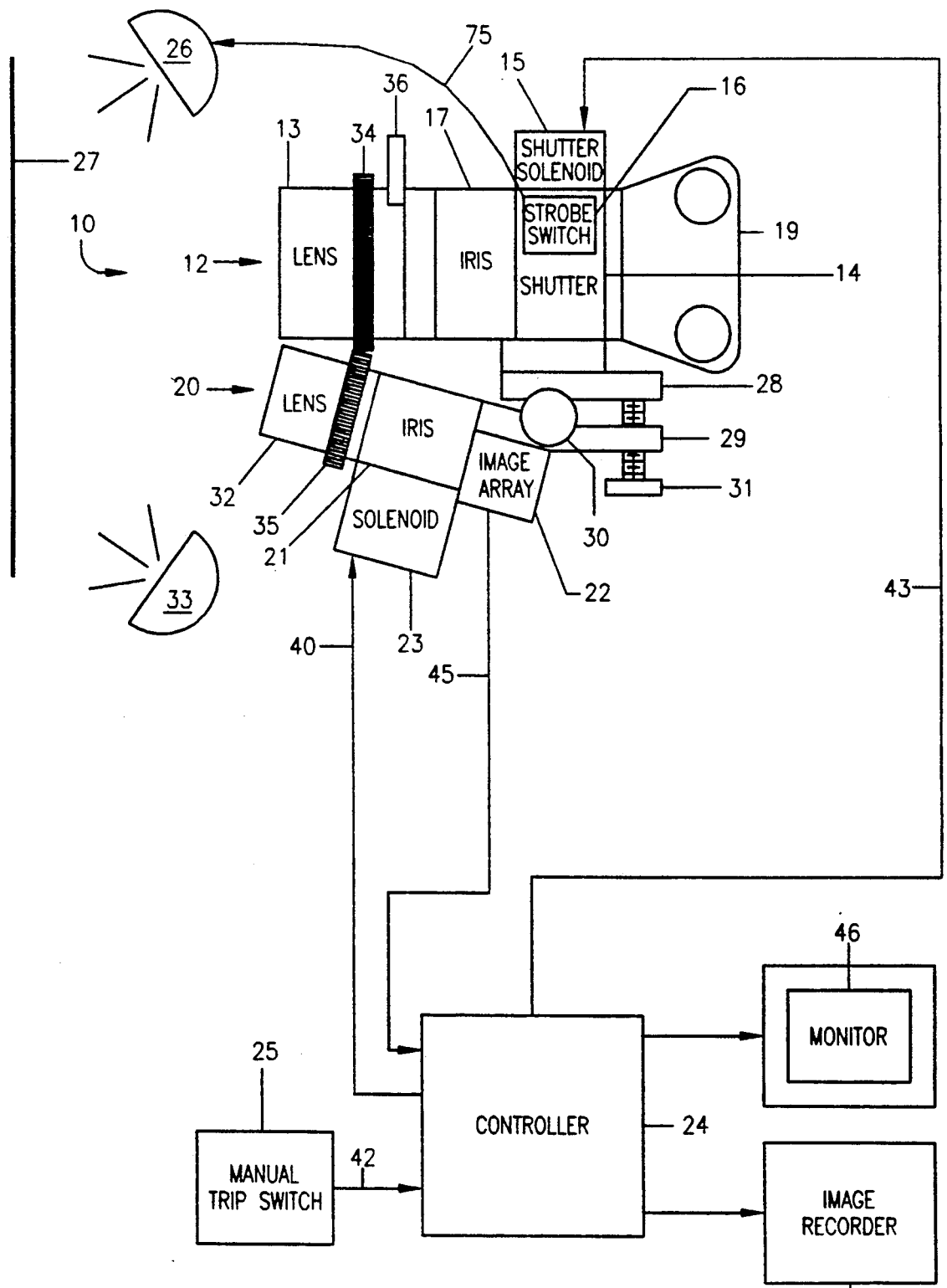
FIG. 1 is a schematic top view of the synchronized zoom camera systems.

FIG. 1 shows the synchronized zoom electronic camera system 10 in schematic form. The photographic subject is located in the image plane 27. The photo camera 12 and the electronic camera 20 are both aimed toward the image plane 27. The photo camera 12 has a first photo camera mount arm 28 attached to it. The electronic camera 20 is mounted on a second electronic camera mount arm 29. The two arms are coupled to each other by a parallax pivot 30. The angular relationship between the two arms is adjusted by a parallax adjustment screw 31 which may be set by the operator.

It is preferable to have the center lines of the two zoom lenses be as close as possible to minimize parallax error. Preferably, the photo camera zoom lens 13 is fitted with a photo camera zoom gear 34 while a complimentary electronic camera lens zoom gear 35 is fitted to the electronic camera zoom lens 32. Rotation of each of these gears alters the focal length of their respective zooms lenses. The photo camera zoom gear 34 will mesh with the electronic camera zoom gear 35 through a gear train to slave the electronic camera zoom lens to the photo camera zoom lens. It is preferred to match the zoom ratios and gear ratios such that the focal lengths provides the same image proportions over a wide range of focal lengths. The relative formats of the photo camera and electronic camera permit a 2:1 zoom lens, for example, to be used on the photo camera and a 7:1 or more zoom lens, for example, to be used on the electronic camera. A portion of 7:1 zoom range may be selected to match the 2:1 range of the photo camera. Typically one zoom lens will be fitted with a manual zoom arm 36 to permit the operator to simultaneously alter the focal length of both lenses at the same time. In general the small range of parallax adjustment will permit continuous mesh or engagement of the gear train within the range of mechanical stops provided in connection with the parallax pivot 30. Although the preferred photo camera zoom lens coupling means and electronic camera zoom lens coupling means is a mechanical gear train, manually actuated by the operator, electric motors and appropriate controls may be provided for the zoom lenses, within the scope of the invention, as are belt and chain drive embodiments.

The photo camera 12 includes a photo camera iris 17 stage and a photo camera shutter 14, located behind the photo camera zoom lens 13. Behind the photo camera shutter 14 is the conventional film transport 19. In operation the photo camera iris 17 controls the aperture or F-stop of the photo camera 12. The photo camera iris 17 is manually preset to a fixed value and it is activated to the open position for viewing and to the pre-set stop during exposure by a mechanical linkage coupled to the shutter solenoid. The photo camera shutter 14 controls the exposure time for the photo camera 12 and it is activated by a photo camera shutter solenoid 15. The photo camera shutter 14 also carries a set of switch contacts forming a photo camera strobe switch 16, which activate the external strobe light 26, via the strobe light connection 75.

The electronic camera 20 includes an electronic camera iris 21 which is operated by an electronic camera iris solenoid 23. In operation the electronic camera iris 21 is stopped down in response to the actuation of the electronic camera iris solenoid 23. Behind the electronic camera iris 21 is an electronic camera image array 22 which is typically a conventional CCD sensor of compact dimensions. An electronic camera image array signal 45 is transmitted from image array 22 to the controller 24, via connection 45.

Figure 3:
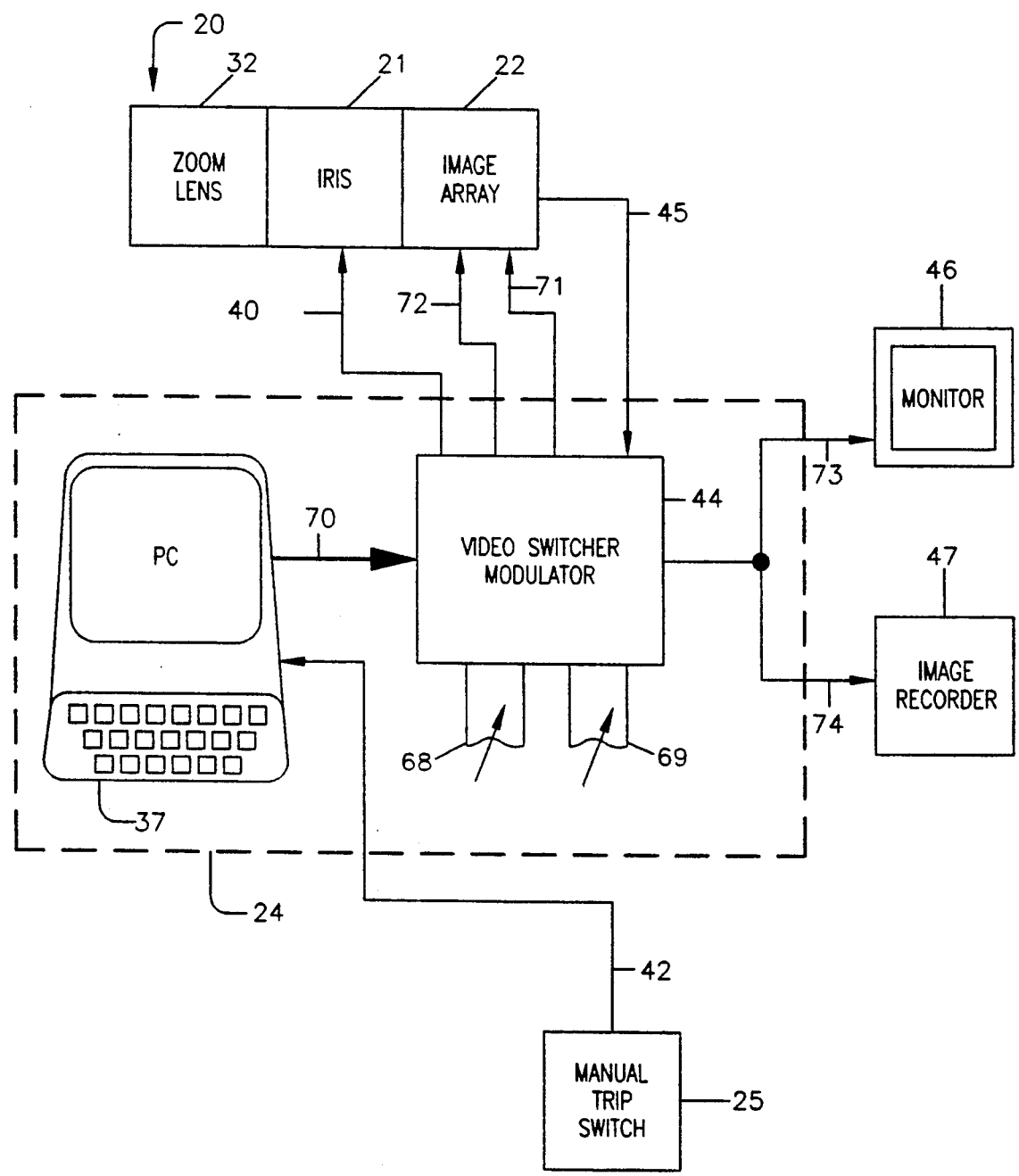
FIG. 3 is block diagram of the controller used to implement a portion of the invention.

In FIG. 3 the controller 24 is shown in more detail. The controller 24 includes a microprocessor based personal computer system 37 which implements the control functions described by the flow-charts. Also associated with the computer system is a video switcher module 44. The video switcher is of conventional design and uses relays to switch resistors 68 and 69 in or out of the color correction circuits and the video gain circuits of the electronic camera depending on the control signals 70 generated by the computer system 37. These control signals are communicated to the electronic camera via signal paths 71 and 72 and are used to alter the color temperature and gain settings for the electronic camera 20. The controller 24 supplies a real time video signal to the monitor 46 in the "compose" state and supplies an electronic capture signal to the magnetic storage media depicted by electronic camera image recorder 47 via appropriate signal connections 73 and 74.

Figure 2A:
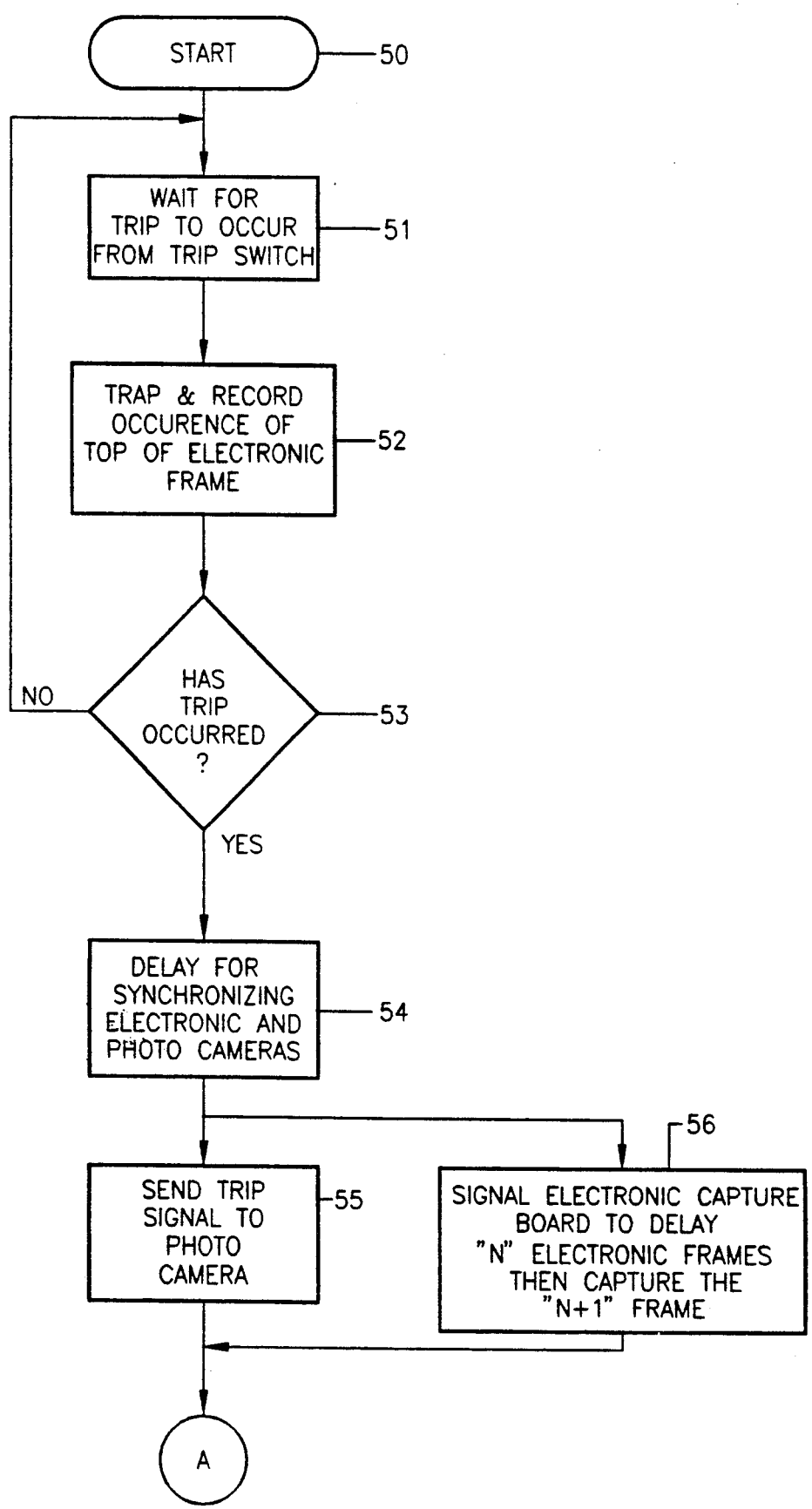
FIG. 2A is a flow chart depicting the operation of the system.
Figure 2B:
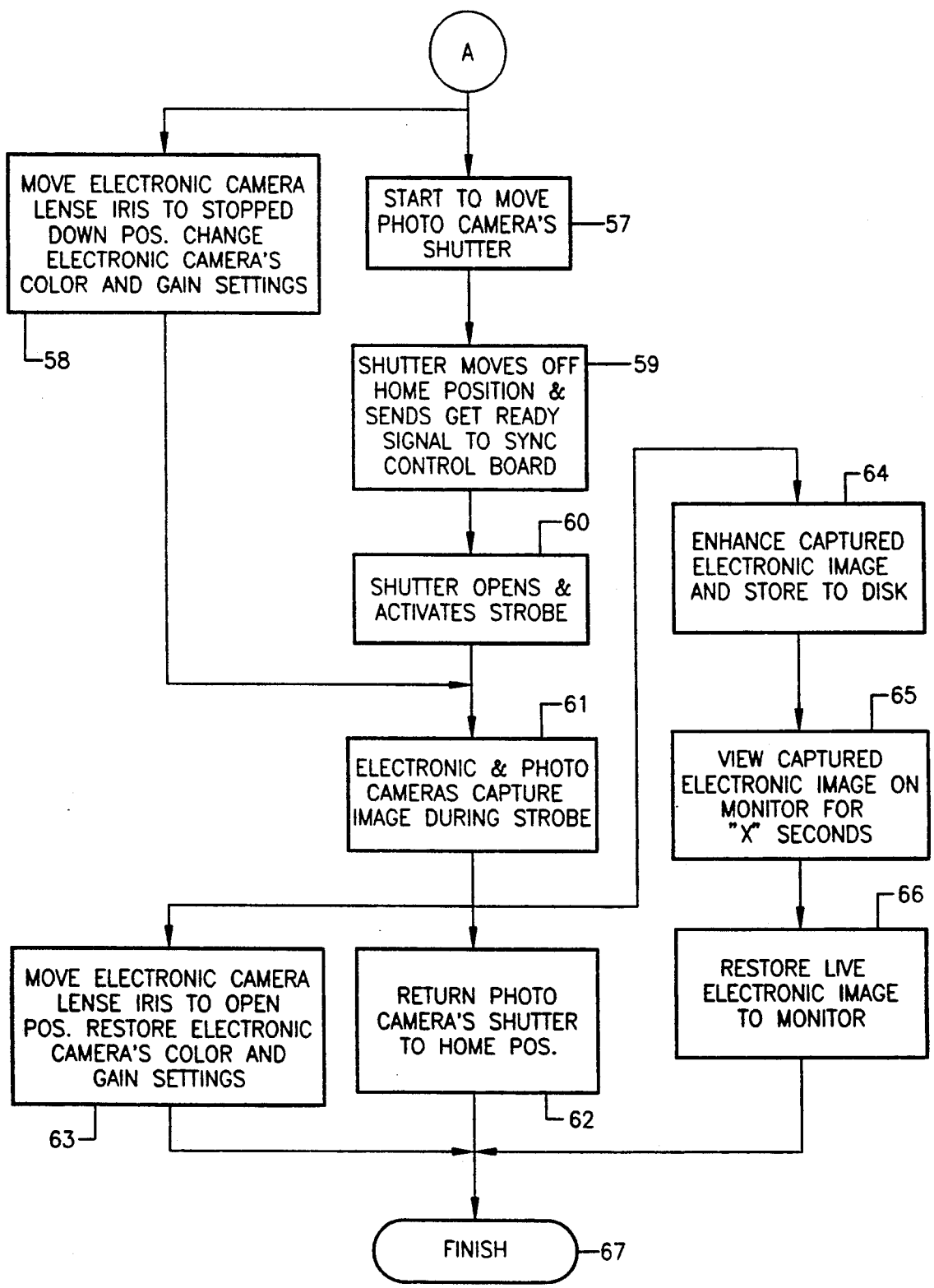
FIG. 2B is a flow chart depicting the operation of the system.

Briefly stated the controller is interfaced with the operator through a manual trip switch 25, connected to the controller through a connection 42. After trip switch 25 actuation the controller 24 generates a sequence of control signals which are described in connection with FIG. 2A and FIG. 2B. FIG. 2A depicts an illustrative but not limiting flow-chart for generating these required control signals. Program flow begins with start block 50 which corresponds to the system powering up in the compose or view state. After the system is started in the compose state it waits for user activation of the trip switch 25 actuation in block 51 via a trip switch signal 42. Once a switch 25 actuation has occurred the system synchronizes its operation with the video framing clock of the electronic camera 20 in block 52, otherwise program flow is redirected to the waiting state represented by block 51. Block 54 is devoted to synchronizing the activation of the photo camera 12 to the electronic camera 20. In general the photo camera shutter 14 is an electro-mechanical device which is slow in comparison to the 60 Hertz video framing rate. Typically the system will wait for 3 frame cycles to elapse before generating other control signals. After synchronization, block 55 generates the photo camera shutter activation signal 43 used to drive the photo camera shutter solenoid 15. In block 56 the electronic camera image recorder 47 is prepared to accept image data after a preset delay of a fixed number of video frames. Turning to FIG. 2B, block 58 issues a set of control signals. In block 58 an electronic camera iris stop down signal 40 is issued to activate the electronic camera iris solenoid 23. Block 58 also generates a color temperature signal and a gain reduction signal on signal paths 71 and 72. In general these control signals will switch a resistor 68 in the color temperature circuitry and will switch a resistor 69 in the video gain amplifier circuitry, altering the color balance and gain of the signal supplied to the electronic camera image recorder 47. In the view state the electronic color temperature is set to 56K to provide a color balance appropriate for modeling lights 33. In the capture state the electronic color temperature is set to 32K for good color balance with the strobe light 26 illumination. A small amount of time elapses in block 59 for the video signal to settle before the photo camera shutter sweeps past the photo camera strobe switch 16 which activates the strobe light 26 through control line 75 as indicated in block 60. Block 61 represents the simultaneous capture of both the photo image and the electronic image by the system. Block 64 represents the transfer of the electronic camera image via electronic camera image array signal 45 to the electronic camera image recorder 47. Block 64 also represents the display of the captured image on the monitor 46 in block 65. In general a half frame video signal is captured and doubled to generate the full frame image for display in block 64. The continuous display of the captured image on the monitor 46 permits the operator to verify the pose captured by the photo camera 12. Program flow through block 62 represents the mechanical return of the shutter to the home position. In block 63 the electronic camera 20 gain and color temperature is restored for the electronic camera 20 to the "compose" state, and the electronic camera iris signal 40 is removed allowing the electronic camera iris solenoid to return iris to the maximum aperture. Block 67 represents the restoration of the system to the compose state for the next exposure and electronic camera image capture cycle.

In summary, in the capture state the photo camera shutter is tripped and the aperture stopped down to a preset value. In the capture state the electronic camera is stopped down and the gain and color balance are altered to preset values which compliment the strobe illumination. In the view state the photo camera will be operated at full aperture. In the view state the electronic camera is operated at full aperture and the color temperature and gain are set for use with the modeling lights.

Although the foregoing description describes an illustrative version of the invention it is apparent to those skilled in the art that various modifications and changes may be made to the system without departing from the scope of the invention.

What is claimed is:

1. A camera system for capturing a photo image on film and an electronic image on a magnetic storage media, said camera system comprising:
   a first photo camera zoom lens;
   a photo camera film transport attached to said first photo camera zoom lens;
   a photo camera shutter located between said photo camera zoom lens and said film transport for controlling the photo image exposure time;
   a second electronic camera zoom lens;
   an electronic image array attached to said second electronic camera zoom lens;
   an electronic camera iris located between said electronic camera zoom lens and said electronic image array;
   an electronic camera iris solenoid coupled to said electronic camera iris for reducing the aperture of said electronic camera iris in a capture state;
   video gain circuit coupled to said electronic image array for providing a first gain setting in a compose state and a second gain setting in a capture state;

color temperature circuit coupled to said electronic image array for providing a first color temperature setting in a compose state and a second color temperature setting in a capture state;

a first photo camera mount arm attached to said film transport, and having a second electronic camera mount arm attached to said electronic camera;

said first photo camera mount arm attached to said second electronic camera mount arm by a parallax pivot;

whereby relative motion of said first and second arms about said parallax pivot controls the magnitude of the parallax error between said first photo camera zoom lens and said second electronic camera zoom lens;

a first photo camera zoom gear attached to said first photo camera zoom lens for adjusting the focal length of said first photo camera zoom lens;

a second electronic camera zoom gear attached to said second electronic camera zoom lens for adjusting the focal length of said second electronic camera zoom lens;

said first photo camera zoom gear engaging said second electronic camera zoom gear whereby said first zoom lens and said second zoom lens are simultaneously altered in focal length in response to rotation of either of said first photo camera zoom gear and said second electronic camera zoom gear;

a manual trip switch for activation by a user;

a controller coupled to said trip switch for generating a shutter activation signal in response to said switch activation, and for generating a capture state video gain signal, and for generating a capture state color temperature signal in response to said shutter activation signal;

whereby said electronic camera image array receives said electronic image at the same time as said film transport receives said photo image.

2. The camera system of claim 1 wherein:
said first color temperature setting is substantially 32K and,
said second color temperature setting is substantially 56K.

3. A camera system for capturing a photo image on film and an electronic image on a magnetic storage media, said camera system comprising:
a first photo camera zoom lens;
a photo camera film transport attached to said first photo camera zoom lens;
a photo camera shutter located between said photo camera zoom lens and said film transport for controlling the photo image exposure time;
a second electronic camera zoom lens;
an electronic image array attached to said second electronic camera zoom lens;
a first photo camera mount arm attached to said film transport, and having a second electronic camera mount arm attached to said electronic camera;
said first photo camera mount arm attached to said second electronic camera mount arm by a parallax pivot;
whereby relative motion of said first and second arms about said parallax pivot controls the magnitude of the parallax error between said first photo camera zoom lens and said second electronic camera zoom lens;
a first photo camera zoom lens coupling means attached to said first photo camera zoom lens for adjusting the focal length of said first photo camera zoom lens;

a second electronic camera zoom lens coupling means attached to said second electronic camera zoom lens for adjusting the focal length of said second electronic camera zoom lens;

said first photo camera zoom lens coupling means for engaging said second electronic camera zoom lens coupling means whereby said first zoom lens and said second zoom lens are simultaneously altered in focal length in response to rotation of either of said first photo camera zoom lens coupling means and said second electronic camera coupling means.

4. The camera system of claim 1 wherein said
said first photo camera zoom lens coupling means is a photo camera zoom gear attached to said photo camera zoom lens;
said electronic camera zoom lens coupling means is an electronic camera zoom gear attached to said electronic camera zoom lens, which is coupled to said photo camera zoom gear.

5. A camera system for capturing a photo image on film and an electronic image on a magnetic storage media, said camera system comprising:
a first photo camera zoom lens;
a photo camera film transport attached to said first photo camera zoom lens;
a photo camera shutter located between said photo camera zoom lens and said film transport for controlling the photo image exposure time;
a second electronic camera zoom lens;
an electronic image array attached to said second electronic camera zoom lens;
an electronic camera iris located between said electronic camera zoom lens and said electronic image array;
an electronic camera iris solenoid coupled to said electronic camera iris for reducing the aperture of said electronic camera iris in a capture state;
video gain circuit coupled to said electronic image array for providing a first gain setting in a compose state and a second gain setting in a capture state;
color temperature circuit coupled to said electronic image array for providing a first color temperature setting in a compose state and a second color temperature setting in a capture state;
a first photo camera mount arm attached to said film transport, and having a second electronic camera mount arm attached to said electronic camera;
said first photo camera mount arm attached to said second electronic camera mount arm by a parallax pivot;
whereby relative motion of said first and second arms about said parallax pivot controls the magnitude of the parallax error between said first photo camera zoom lens and said second electronic camera zoom lens;
a first photo camera zoom lens coupling means attached to said first photo camera zoom lens for adjusting the focal length of said first photo camera zoom lens;
a second electronic camera zoom lens coupling means attached to said second electronic camera zoom lens for adjusting the focal length of said second electronic camera zoom lens;
said first photo camera zoom lens coupling means for engaging said second electronic camera zoom lens coupling means whereby said first zoom lens and said second zoom lens are simultaneously altered in focal length in response to rotation of either of said first photo camera zoom lens coupling means and said second electronic camera coupling means.

* * * * *

UNITED STATES PATENT AND TRADEMARK OFFICE
CERTIFICATE OF CORRECTION

PATENT NO. : 5,329,325
DATED : July 12, 1994
INVENTOR(S) : Larry D. McClellan, et. al.

It is certified that error appears in the above-indentified patent and that said Letters Patent is hereby corrected as shown below:

In column 1, line 62, please delete the word DRAWING, and insert therefor --DRAWINGS--

In column 2, line 26, 27, please delete the word complimentary, and insert therefor --complementary--

In column 6, line 12, after the word "wherein", please insert --:--

In column 6, line 12, after the word "wherein", please delete the word "said"

Signed and Sealed this

Thirtieth Day of May, 1995

Attest:

BRUCE LEHMAN

Attesting Officer

Commissioner of Patents and Trademarks